(12) United States Patent
Hwang et al.

(10) Patent No.: US 10,555,030 B2
(45) Date of Patent: Feb. 4, 2020

(54) METHOD AND APPARATUS FOR REPRODUCING MULTIMEDIA DATA

(71) Applicants: Samsung Electronics Co., Ltd., Gyeonggi-do (KR); KYONGGI UNIVERSITY INDUSTRY & ACADEMIA COOPERATION FOUNDATION, Gyeonggi-do (KR)

(72) Inventors: Sung-Oh Hwang, Yongin-si (KR); Byoung-Dai Lee, Yongin-si (KR); Hyun-Koo Yang, Seoul (KR); Sung-Hee Hwang, Suwon-si (KR)

(73) Assignees: Samsung Electronics Co., Ltd., Suwon-si (KR); Kyonggi University Industry & Academia Cooperation Foundation, Suwon-si (KR)

( * ) Notice: Subject to any disclaimer, the term of this patent is extended or adjusted under 35 U.S.C. 154(b) by 0 days.

(21) Appl. No.: 15/109,595

(22) PCT Filed: Jan. 8, 2015

(86) PCT No.: PCT/KR2015/000187
§ 371 (c)(1),
(2) Date: Jul. 1, 2016

(87) PCT Pub. No.: WO2015/105348
PCT Pub. Date: Jul. 16, 2015

(65) Prior Publication Data
US 2016/0330507 A1    Nov. 10, 2016

(30) Foreign Application Priority Data

Jan. 8, 2014  (KR) .................. 10-2014-0002489

(51) Int. Cl.
*H04N 21/43*  (2011.01)
*H04N 21/8547*  (2011.01)
(Continued)

(52) U.S. Cl.
CPC ..... *H04N 21/4302* (2013.01); *H04N 21/4382* (2013.01); *H04N 21/64322* (2013.01); *H04N 21/8547* (2013.01)

(58) Field of Classification Search
CPC .......... H04N 21/4302; H04N 21/4382; H04N 21/64322; H04N 21/8547
See application file for complete search history.

(56) References Cited

U.S. PATENT DOCUMENTS

| | | | |
|---|---|---|---|
| 7,486,658 B2 * | 2/2009 | Kumar | .................. H04L 47/10 370/252 |
| 2008/0090513 A1 * | 4/2008 | Collins | .................. H04H 60/65 455/3.01 |

(Continued)

FOREIGN PATENT DOCUMENTS

| | | |
|---|---|---|
| CN | 102790651 A | 11/2012 |
| CN | 102971993 A | 3/2013 |

(Continued)

OTHER PUBLICATIONS

Chinese Office Action dated Mar. 5, 2019, issued in Chinese Patent Application No. 201580004082.X.

*Primary Examiner* — Chenea Davis
(74) *Attorney, Agent, or Firm* — Jefferson IP Law, LLP

(57) ABSTRACT

The present invention provides a method and an apparatus for reproducing multimedia data in a broadcasting and communication system. The apparatus for reproducing multimedia data according to an embodiment of the present invention comprises: a receiver for receiving multimedia data; a data processor for processing the received multimedia data and extracting a data unit and signaling information; a synchronization information processor for extracting synchronization information related to a broadcasting image provided by a current service from the signaling information; a service demultiplexer for extracting audio data or (Continued)

video data from the data unit; and a broadcasting image reproducer for decoding the audio data or video data, and reproducing the decoded audio data or decoded video data on the basis of the synchronization information.

18 Claims, 5 Drawing Sheets

(51) Int. Cl.
*H04N 21/438* (2011.01)
*H04N 21/643* (2011.01)

(56) References Cited

U.S. PATENT DOCUMENTS

| | | |
|---|---|---|
| 2010/0046633 A1 | 2/2010 | Kasai et al. |
| 2011/0164686 A1 | 7/2011 | Lu et al. |
| 2011/0265129 A1 | 10/2011 | Na et al. |
| 2012/0307149 A1* | 12/2012 | Meek .............. H04N 5/607 348/515 |
| 2013/0094545 A1 | 4/2013 | Park et al. |
| 2013/0268985 A1 | 10/2013 | Kim et al. |
| 2014/0118473 A1* | 5/2014 | Halavy .............. H04N 7/152 348/14.09 |
| 2016/0080171 A1* | 3/2016 | Chen .............. H04L 41/0816 370/465 |

FOREIGN PATENT DOCUMENTS

| | | |
|---|---|---|
| KR | 10-2011-0069006 A | 6/2011 |
| KR | 10-2013-0040090 A | 4/2013 |
| KR | 10-2013-0113163 A | 10/2013 |
| WO | 2013-100957 A1 | 7/2013 |

\* cited by examiner

METHOD AND APPARATUS FOR REPRODUCING MULTIMEDIA DATA

PRIORITY

This application is a National Phase Entry of PCT international Application No. PCT/KR2015/000187, which was filed on Jan. 8, 2015, and claims a priority to Korean Patent Application No. 10-2014-0002489, which was filed on Jan. 8, 2014, the contents of which are incorporated herein by reference.

TECHNICAL FIELD

The present invention relates to a method and an apparatus for playing multimedia data in a broadcasting and communication system.

BACKGROUND ART

With the convergence of broadcasting and communications, multimedia services through diverse media are becoming common. That is, services using conventional broadcast media including ground waves, a satellite, cable, and the like have become diversified based on a digital method, simultaneously with the introduction of mobile broadcasting services, such as Digital Multimedia Broadcasting (DMB), Digital Video Broadcasting-Handheld (DVB-H), and Advanced Television Systems Committee-Mobile/Handheld (ATSC-M/H), and hybrid services including Internet Protocol TV (IPTV). Particularly, digital broadcasting not only provides programs having image quality that is dozens of times higher than that of conventional analog broadcasting and CD-level sound quality and provides an increasing number of channels, allowing a user a wide range of options, but also offers new interactive services including home shopping, home banking, electronic mail, and Internet services, thereby providing higher quality broadcasting services than the conventional broadcasting.

Digital broadcasting service quality is divided into video quality (VQ) that is image quality associated with video content itself, such as the quality, resolution, and color representation of a screen, video quality of service (V-QoS) that is image quality associated with a process of transmitting multimedia data through a network from a service provider to an end user, and quality of experience (QoE) that is service quality generally experienced by an end user including not only video content but also the reactivity, interrelationship, usefulness, and ambient conditions of a service. Particularly, channel zapping time, which is the duration of time taken for the user to select a channel and to play a broadcast image on the channel, is used as a main indicator for QoE measurement. To play a broadcast image, not only compressed video and audio data but also synchronization information relating to a time to play these data on a screen via decoding is necessary. In a conventional art, synchronization information is transmitted, being included in a data unit that transmits audio or video data according to a Real-Time Transport Protocol/Real-Time Control Protocol (RTP/RTCP), or a data stream, which is separate from an audio/video stream, is assigned to transmit synchronization information according to an MPEG Media Transport (MMT). Generally, data transmission is performed through a protocol stack including various layers. Thus, to acquire information needed to play a broadcast image, there is needed a process of extracting, from received original data, encapsulated data starting from the lowest physical layer to a specific layer of a protocol stack where compressed video/audio data and synchronization information are transmitted, and time required for this process ultimately affects channel zapping time.

FIG. 1 is a diagram of a general data transfer protocol stack for a digital broadcasting service. Although FIG. 1 illustrates a protocol stack including four layers 110 to 140 as an example, a protocol stack having a structure of further subdivided layers may be employed as necessary.

Referring to FIG. 1, compressed audio/video data and synchronization information on an image are encapsulated in a data unit used for each layer as passing through the layer of the data transfer protocol stack. For example, video data compressed in an application/presentation/session layer 110 of a transmitting device is encapsulated in a payload of a data unit used for a network/transport layer 120 and is transmitted to the next layers, and a data link layer 130 stores data, which is transmitted from the higher layer, in a payload in a data unit thereof and transmits the data to the next layer. This process is repeated until the data is transmitted to a physical layer 140, which is the lowest layer, and a data unit generated in the physical layer 140 is transmitted to a receiving device through a transmission medium.

The receiving device extracts real data in reverse order of the process of the transmitting device. That is, a physical layer 140 extracts the data included in a payload of the data unit received through the transmission medium and transmits the data to a higher layer, which is a data link layer 130, and the data link layer 130 analyzes the transmitted data to extract a data unit used for a network/transport layer 120 and transmits the data unit to a network/transport layer 120. This process is repeated until an application/presentation/session layer 110 as the highest layer, and the application/presentation/session layer 110 ultimately extracts the compressed video/audio data and synchronization information to play an image on a screen.

As described above, the receiving device decodes the received audio/video data and determines a time to play a decoded image based on the relevant synchronization information. According to a conventional art, synchronization information is transmitted through a data unit generated for transmitting compressed video or audio information, as in FIG. 1, or is transmitted through a separate data stream from a data stream for the transmission of audio/video data.

FIGS. 2 and 3 illustrate an example of transmitting synchronization information through a separate data stream from a data stream for transmission of audio/video data.

Referring to FIGS. 2 and 3, the synchronization information refers to audio and video data to be played on a screen at a corresponding time, in which first audio data Audio data-1 and first video data Video data-1 need to be played at T1, and second audio data Audio data-2 and second video data Video data-2 need to be played at T3 and T2, respectively. Also, third audio data Audio data-3 and third video data Video data-3 need to be played at T5 and T3, respectively, and fourth video data Video data-4 and fifth video data Video data-5 need to be played at T4 and T5, respectively. As such, synchronization information is generally transmitted through the same layer (Layer X) as a protocol layer that transmits audio and video data, in which a network/transport layer or a higher layer is used.

DETAILED DESCRIPTION OF THE INVENTION

Technical Problem

Compressed audio/video data and time to play the audio/video data on a screen via decoding, that is, time to receive synchronization information, are key factors that determine channel zapping time. The time to receive the synchronization information may be subdivided into time to receive encapsulated data through a transmission medium and time to finally extract the compressed audio/video data and the synchronization information from the received data through a protocol stack from a physical layer. However, when the audio/video data and the synchronization information are transmitted through the same protocol layer as in the conventional art, there are two problems in terms of time to acquire the synchronization information. First, when N services are transmitted via multiplexing in a single transport stream, the N services uses a bandwidth in a partitioned manner, in which case the transmission of a data unit that transmits not only audio/video data on each service hut synchronization information is performed with decreasing frequency, causing an increase in time to receive the synchronization information accordingly. Second, to extract the synchronization information, a process is needed which extracts encapsulated data from a physical layer as the lowest layer of a protocol stack to the highest layer, and thus processing time may increase, ultimately causing an increase in channel zapping time.

Therefore, the present invention has been made in view of the above-mentioned problems, and an aspect of the present invention is to provide an apparatus and a method for playing multimedia data that are capable of transmitting synchronization information through layer L2, that is, a data link layer, not through a protocol layer where compressed audio/video data is transmitted, to decrease time to receive and extract the synchronization information, thereby reducing overall channel zapping time.

Technical Solution

An apparatus for playing multimedia data according to an embodiment of the present invention includes: a receiver that receives multimedia data: a data processor that processes the received multimedia data to extract a data unit and signaling information; a synchronization information processor that extracts, from the signaling information, synchronization information relating to a broadcast image provided by a current service; a service demultiplexer that extracts audio data or video data from the data unit; and a broadcast image player that decodes the audio data or video data and plays the decoded audio data or video data based on the synchronization information.

A method of playing multimedia data according to an embodiment of the present invention includes: receiving multimedia data; processing the received multimedia data to extract a data unit and signaling information; extracting, from the signaling information, synchronization information relating to a broadcast image provided by a current service; extracting audio data or video data from the data unit; and decoding the audio data or video data and playing the decoded audio data or video data based on the synchronization information.

MODE FOR CARRYING OUT THE INVENTION

Figure 1:
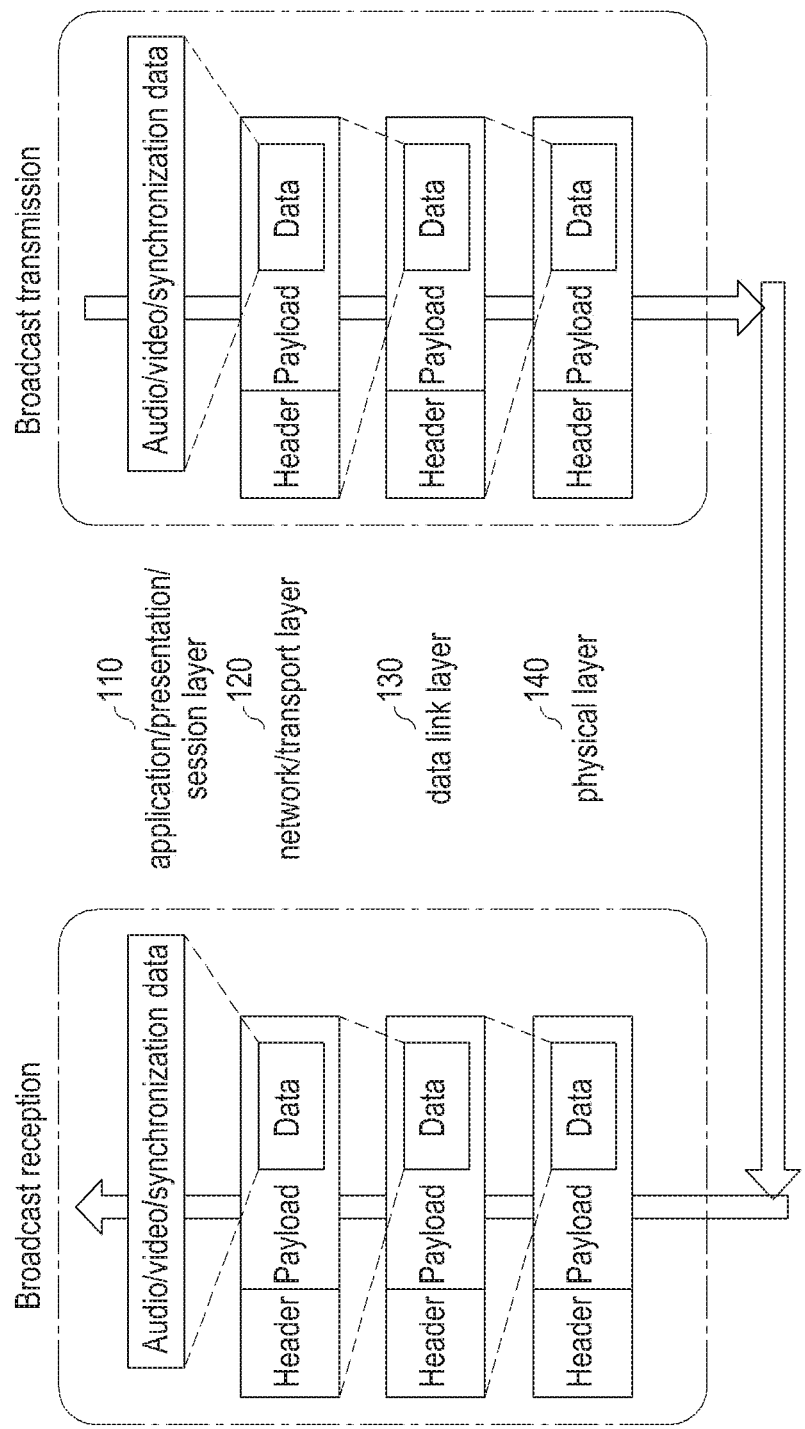
FIG. 1 is a diagram of a general data transfer protocol stack for a digital broadcasting service.
Figure 2:
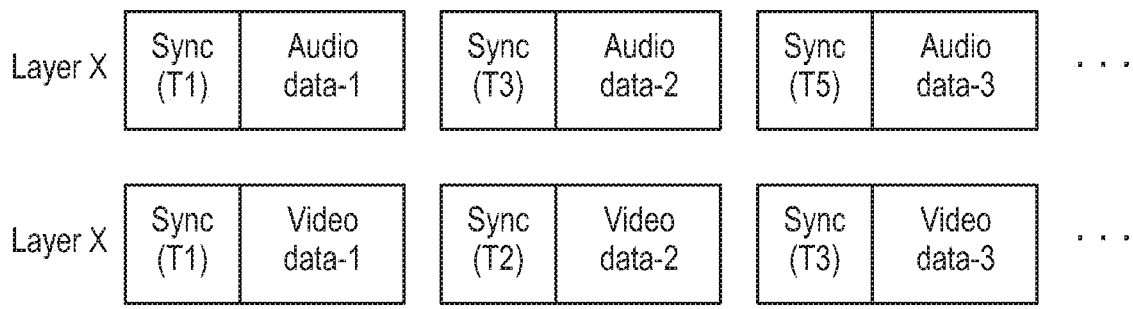
FIGS. 2 and 3 illustrate an example of transmitting synchronization information through a separate data stream from a data stream for transmission of audio/video data.
Figure 3:
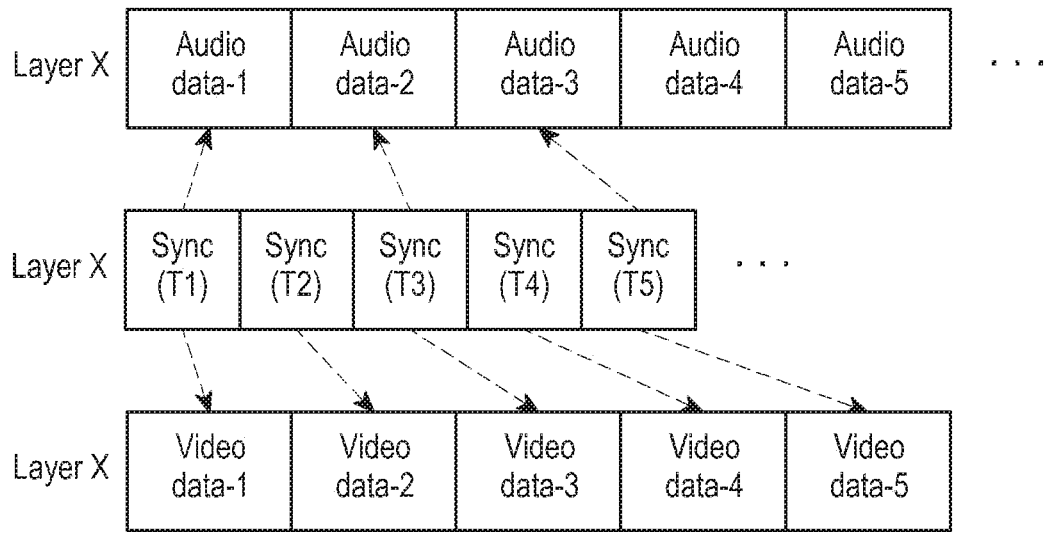

Hereinafter, embodiments of the present invention will be described in more detail with reference to the accompanying drawings so as to allow those skilled in the art to easily implement the present invention. However, the present invention may be implemented in various different forms and is not limited to embodiments described herein.

Further, parts irrelevant to the present invention are omitted in the drawings to make the present invention clear and the same reference numerals are designated to the same or similar components throughout the specification.

Throughout the specification and the claims, when it is described that a certain part includes a certain element, this means that the unit may further include any other element rather than exclude the any other element unless otherwise indicated.

Figure 4:
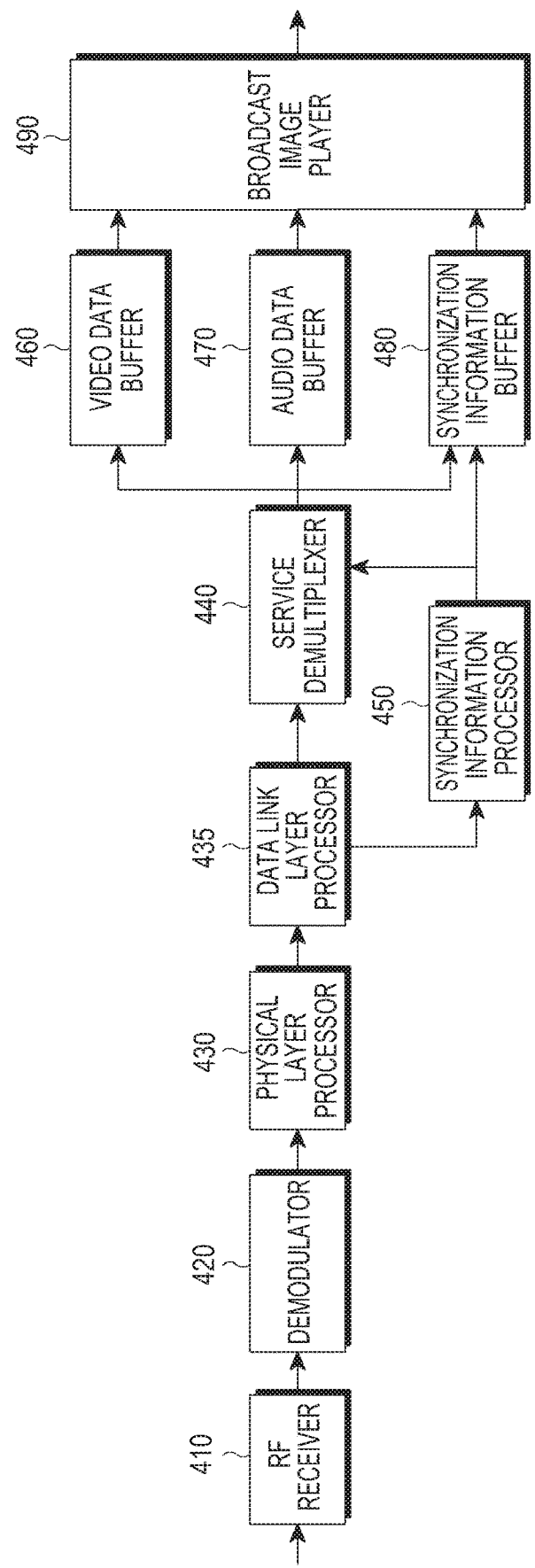
FIG. 4 is a diagram of a device for synchronizing audio and video of a broadcast image using synchronization-related signaling information transmitted through a data link layer according to an embodiment of the present invention.

FIG. 4 is a diagram of a device for synchronizing audio and video of a broadcast image using synchronization-related signaling information transmitted through a data link layer according to an embodiment of the present invention.

Referring to FIG. 4, a synchronization device includes a radio frequency (RF) receiver 410, a demodulator 420, a physical layer processor 430, a data link layer processor 435, a service demultiplexer 440, a synchronization information processor 450, a video data buffer 460, an audio data buffer 470, a synchronization information buffer 480, and a broadcast image player 490. When a user selects a random service, the RF receiver 410 changes a channel to a frequency at which the service is transmitted to receive an analog signal. The demodulator 420 converts the analog signal, which is received through the RE receiver 410, into a digital signal and transmits the digital signal to the physical layer processor 430. The physical layer processor 430 performs an operation that is to be implemented in a physical layer of a transfer protocol stack and transmits a result of the operation to the data link layer processor 435. The data link layer processor 435 performs an operation that is to be implemented in a data link layer to transmit network/transport-layer packets to the service demultiplexer 440, and particularly extracts and transmits a table including synchronization information to the synchronization information processor 450. The operation that is to be implemented in the data link layer may include one of an operation of extracting a network/transport-layer data unit from a data link-layer data unit and an operation of extracting signaling information from the data link-layer data unit. The synchronization information processor 450 extracts synchronization information relating to a broadcast image provided by a current service from the signaling information processed in the data link layer processor 435 and transmits the synchronization information to the broadcast image player 490 via the synchronization information buffer 480. The service demultiplexer 440 extracts data streams forming the service, which respectively include an audio stream and a video stream of the selected service, from the data unit transmitted from the data link layer processor 435 and transmits the data streams to the broadcast image player 490 via the audio data buffer 470 and the video data buffer 460. Further, the service demultiplexer 440 extracts the synchronization information transmitted from a higher layer and transmits the synchronization information to the broadcast image player 490 via the synchronization information buffer 480. The broadcast image player 490 decodes received audio data and video data and plays a broadcast image at a corresponding time based on the synchronization information.

A main feature of the synchronization device according to the embodiment of the present invention is the synchronization information processor 450. That is, the synchronization information processor 450 performs an operation of extracting only synchronization-related signal information (that is, synchronization information) from data transmitted from the data link layer processor 435 and forwards the transmitted data to the service demultiplexer 440 when the operation is finished.

Meanwhile, although FIG. 4 illustrates the physical layer processor 430 and the data link layer processor 435 as separate devices, these processors may be configured as a single device, for example, a data processor. Further, although the synchronization information processor 450 is illustrated as a separate device from the data link layer processor 435, such a configuration is merely an embodiment of the present invention and the synchronization information processor 450 may be included in the data link layer processor 435 or a data processor.

Figure 5:
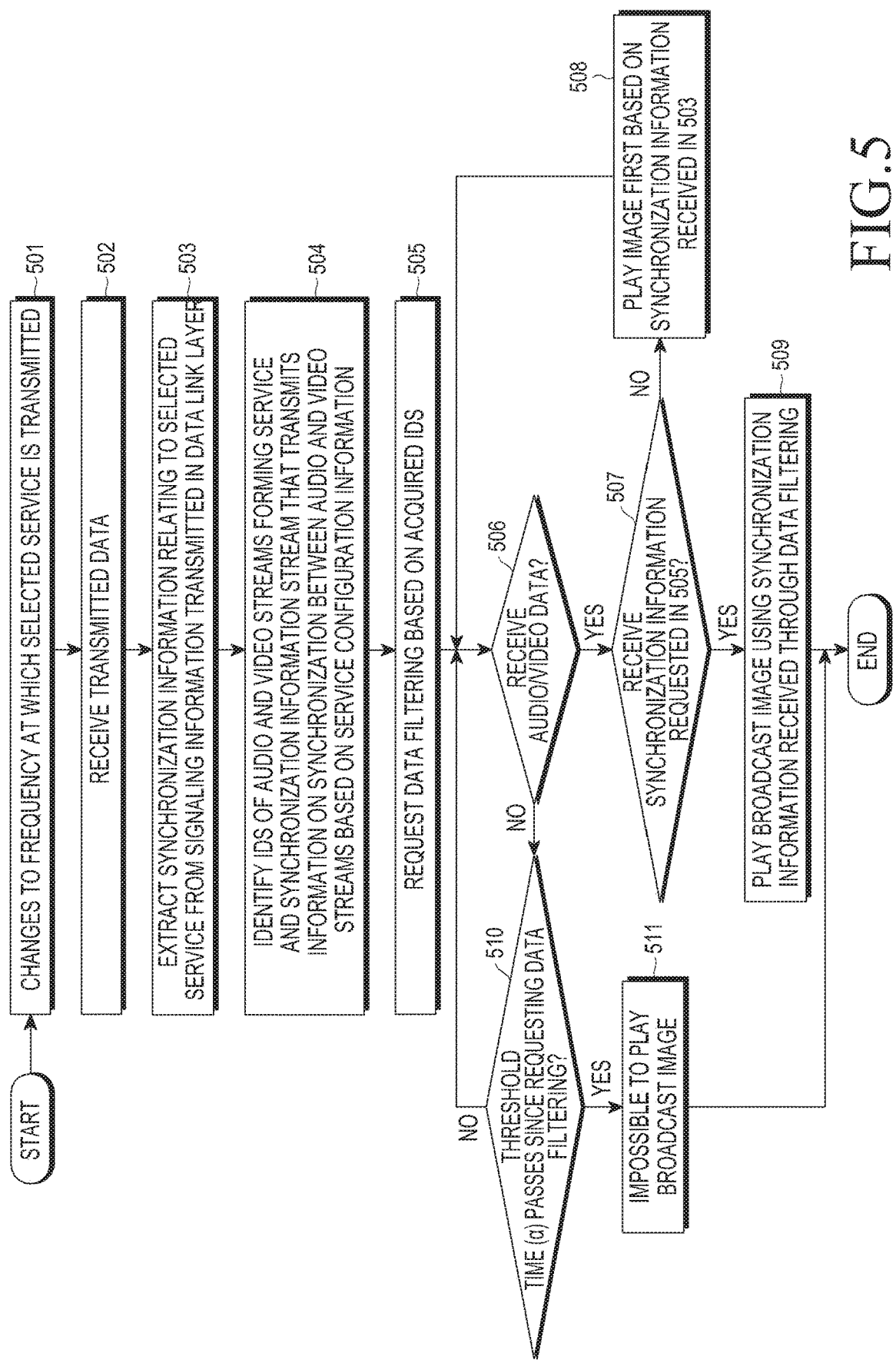
FIG. 5 is a diagram of a processing procedure for a synchronization device to play a broadcast image using transmitted synchronization information according to an embodiment of the present invention.

FIG. 5 is a diagram of a processing procedure for a synchronization device to play a broadcast image using transmitted synchronization information according to an embodiment of the present invention.

Referring to FIG. 5, when a specific service is selected by a user, the synchronization device changes a channel to a frequency at which the service is transmitted (501) and receives a data unit about the service selected on a corresponding channel to extract data included in a payload (502). Subsequently, the synchronization device extracts signaling information present in a data link layer from the received data and acquires synchronization information relating to a broadcast image of the service selected by the user from the signaling information (503). The service may include a plurality of video streams, audio streams, and data streams, and the synchronization device needs to acquire pieces of related identifier (ID) information in order to filter components forming the service. Thus, the synchronization device identifies IDs of the audio and video streams forming the service and a synchronization information stream, which transmits information on synchronization between the audio and video streams based on service configuration information (504). The service configuration information may be acquired by analyzing the signaling information transmitted via the data link layer or using information used for an application program layer, such as an electronics service guide (ESG). Subsequently, the synchronization device requests data filtering using the IDs of the service components (505) and identifies whether data relating to the IDs of the service components is received among the data transmitted at the current frequency (506). Next, the synchronization device receives audio and video data and identifies whether synchronization information relating to image data of which data filtering is requested is received (507). When the relating synchronization information is not yet received, the synchronization device plays the broadcast image based on the synchronization information received in 503 (508), and goes back to an operation of identifying whether data relating to the identified IDs of the service components is received (506). Meanwhile, when the relating synchronization information is received, the synchronization device plays the broadcast image using the relating synchronization information (509). When no audio and video data are received in operation 506, the synchronization device identifies whether a certain period of time (α) passes since requesting data filtering (510). When the certain period of time does not pass, the synchronization device goes back to operation 506 to wait to receive audio/video data. When no audio and video data are received even after the lapse of the certain period of time, the synchronization device displays to the user that it is impossible to receive an image and ends the image playing procedure (511).

Figure 6:
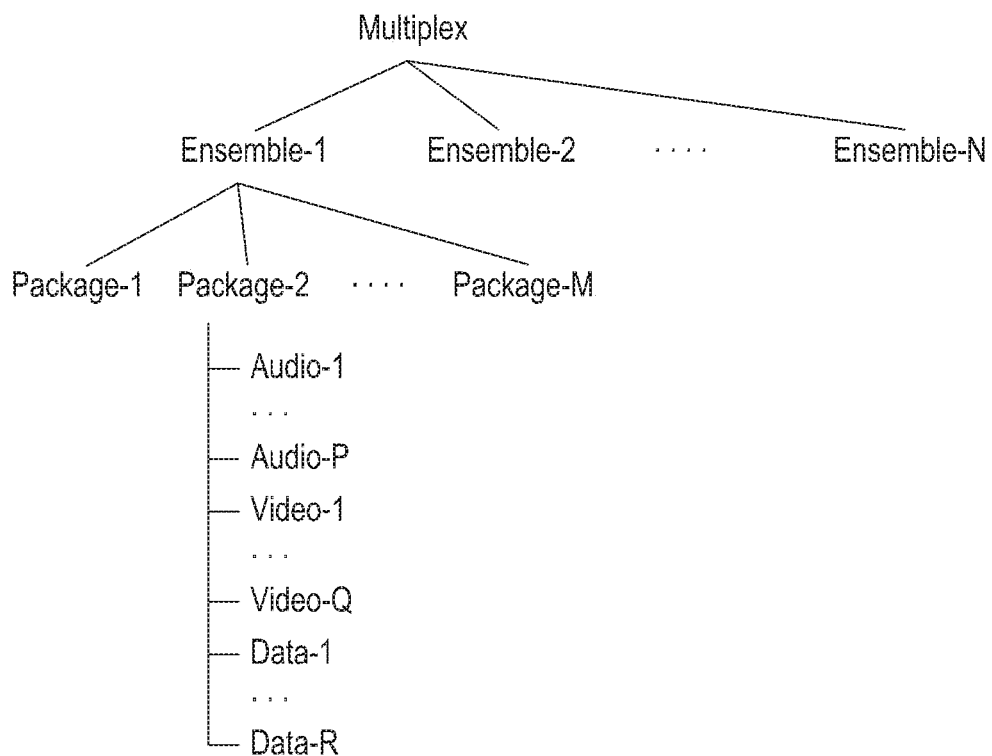
FIG. 6 is a logical diagram of a digital broadcasting service according to an embodiment of the present invention.

FIG. 6 is a logical diagram of a digital broadcasting service according to an embodiment of the present invention.

Referring to FIG. 6, a transport stream Multiplex transmitted through each frequency includes N ensembles Ensemble-1 to Ensemble-N. Each ensemble includes a plurality of packages Package-1 to Package-M and provides a grouping of related packages A package refers to an actual broadcast service and internally includes a plurality of audio/video/data streams Audio-1 to Audio-P, Video-1 to Video-Q, and Data-1 to Data-R. According to characteristics of a service, one audio stream and one video stream may be selected and played, or a plurality of audio/video/data streams may be selected and simultaneously played through partitioned screens.

Meanwhile, terms used in the present specification including FIG. 6 are only for describing logical concepts of a broadcasting service, and the present invention may also be applied to a service using different terms having the same meanings without being limited to the foregoing terms. For example, a transport stream may refer to all data transmitted through physical-layer frames in one frequency band, and an ensemble may refer to a logical channel (physical layer pipe (PLP)) present in the physical-layer frames.

Hereinafter, a format of a media sync table (MST), which is a table storing synchronization information transmitted through a data link layer according to the embodiment of the present invention, will be described in detail with reference to specific embodiments.

First Embodiment

In a first embodiment of the present invention, related audio and video data are designated based on audio and video play times in providing synchronization information in Table 1, and each MST transmits synchronization information on an individual package.

TABLE 1

| Syntax | Number of bits | Format |
|---|---|---|
| media_sync_section( ) { | | |
| table_id | 8 | 0xXX |
| section_syntax_indicator | 1 | '0' |
| private_indicator | 1 | '1' |
| reserved | 2 | '11' |
| section_length | 12 | uimbsf |
| table_id_extension { | | |
| package_id | 16 | uimbsf |
| } | | |
| reserved | 2 | '11' |
| version_number | 5 | uimbsf |
| current_next_indicator | 1 | bslbf |
| section_number | 8 | 0x00 |
| last_section_number | 8 | 0x00 |

TABLE 1-continued

| Syntax | Number of bits | Format |
|---|---|---|
|     MST_protocol_version | 8 | uimbsf |
|     multiplex_id | 16 | uimbsf |
|     ensemble_id | 8 | uimbsf |
|     streaming_protocol | 3 | uimbsf |
|     default_video_stream_id | 16 | uimbsf |
|     default_audio_stream_id | 16 | uimbsf |
|     num_sync_data | 8 | uimbsf |
|     for (i = 0; i<num_sync_data; ++i) { | | |
|       media_sync_data(streaming_protocol); | | |
|     } | | |
| } | | |

Elements in Table 1 are described as follows.

table_id—a unique number referring to an MST; eight bits; having a unique value that is distinguished from another table transmitted in the data link layer.

section_syntax_indicator—indicating the kind of a private section; always set to '1.' private—indicator—a flag indicating a private section; always set to '1.' section—length—the size of a section; following the uimsbf (Unsigned Integer, Most Significant Bit First) format.

package_id—the ID of a package relating to synchronization information included in an MST section.

version number—version information on an MST section; increasing by (1 modulo 32) when the content of the MST section is changed; when current—next—indicator is set to '0,' version information refers to version information on the next applicable MST section, not a currently applicable MST section.

current_next_indicator—indicating currently applicable synchronization information when set to '1,' and indicating that synchronization information is not currently applicable but is applicable next when set to '0'; following the bslbf (Bit String, Left Bit First) format.

section—number—always set to '0.' last—section—number—always set to '0.'

MST_protocol_version—indicating a version of an MST syntax.

multiplex_id—the ID of a multiplex.

ensemble_id—the ID of an ensemble.

streaming_protocol—referring to a streaming protocol used for the transmission of audio and video data; synchronization information is variable according to a used streaming protocol and Table 2 lists values used for streaming protocol.

TABLE 2

| streaming_protocol value | Meaning |
|---|---|
| 000 | MMT |
| 001 | RTP/RTCP |
| 010 | DASH |
| 011-111 | Resented for future use | default_video_stream_id—the ID of a video stream to be played first when a user selects a service.

default_audio_stream_id—the ID of an audio stream to be played first when a user selects a service.

num_sync_data—the number of pieces of synchronization information transmitted in an MST section.

media_sync_data—a structure storing actual synchronization information.

media_sync_data stores information on a time to actually play audio/video data after decoding, and such synchronization information may have a different form depending on a streaming protocol for the transmission of audio/video data.

Table 3 illustrates an example of media_sync_data when an MMT protocol is used.

TABLE 3

| Syntax | Number of bits | Format |
|---|---|---|
| media_sync_data(streaming_protocol) { | | |
|     audio_mpu_seq_num | 32 | uimbsf |
|     video_mpu_seq_num | 32 | uimbsf |
|     presentation_time | 64 | uimbsf |
| } | | |

Elements in Table 3 are described as follows.

audio_mpu_seq_num—the sequence number of an audio media processing unit (MPU).

video_mpu_seq_num—the sequence number of a video MPU.

presentation time—a time to play audio/video data, indicated by audio_mpu_seq_num and video_mpu_seq_num, on a screen via decoding.

Table 4 illustrates an example of media_sync_data when an RTP protocol is used.

TABLE 4

| Syntax | Number of bits | Format |
|---|---|---|
| media_sync_data(streaming_protocol) { | | |
|     audio_packet_seq_num | 16 | uimbsf |
|     video_packet_seq_num | 16 | uimbsf |
|       timestamp | 32 | uimbsf |
| } | | |

Elements in Table 4 are described as follows.

audio_packet_seq_num—the sequence number of an RTP packet storing audio data.

video_packet_seq_num—the sequence number of an RTP packet storing video data.

timestamp—a time to play audio/video data, indicated by audio_packet_seq_num and video_packet_seq_num, on a screen via decoding.

Second Embodiment

In a second embodiment of the present invention, play times are independently stored with respect to audio and video data in providing synchronization information in Table 5, and each MST transmits synchronization information on an individual package.

TABLE 5

| Syntax | Number of bits | Format |
|---|---|---|
| media_sync_section( ) { | | |
|   table_id | 8 | 0xXX |
|   section_syntax_indicator | 1 | '0' |
|   private_indicator | 1 | '1' |
|     reserved | 2 | '11' |
|   section_length | 12 | uimbsf |
|   table_id_extension { | | |
|     package_id | 16 | uimbsf |
|   } | | |
|     reserved | 2 | '11' |

TABLE 5-continued

| Syntax | Number of bits | Format |
|---|---|---|
| version_number | 5 | uimbsf |
| current_next_indicator | 1 | bslbf |
| section_number | 8 | 0x00 |
| last_section_number | 8 | 0x00 |
| MST_protocol_version | 8 | uimbsf |
| multiplex_id | 16 | uimbsf |
| ensemble_id | 8 | uimbsf |
| streaming_protocol | 3 | uimbsf |
| default_video_stream_id | 16 | uimbsf |
| num_video_sync_data | 8 | uimbsf |
| for (i = 0; i<num_video_sync_data; ++i) { | | |
| media_sync_data(streaming_protocol); | | |
| default_audio_stream_id | 16 | uimbsf |
| num_audio_sync_data | 8 | uimbsf |
| for (i = 0; i<num_audio_sync_data; ++i) { | | |
| media_sync_data(streaming_protocol); | | |
| } | | |
| } | | |

Elements in Table 5 are described as follows. Descriptions of the same elements as described above are omitted in the following table.

num_vido_sync_data—the number of pieces of synchronization information relating to video transmitted in an MST section.

num_audio_sync_data—the number of pieces of synchronization information relating to audio transmitted in an MST section.

media_sync_data—a structure storing actual synchronization information.

media_sync_data stores information on a time to actually play audio/video data after decoding, and such synchronization information may have a different form depending on a streaming protocol for the transmission of audio/video data.

Table 6 illustrates an example of media_sync_data when the MMT protocol is used.

TABLE 6

| Syntax | Number of bits | Format |
|---|---|---|
| media_sync_data(streaming_protocol, media_type) { | | |
| media_type | 2 | bslbf |
| mpu_seq_num | 32 | uimbsf |
| presentation_time | 64 | uimbsf |
| } | | |

Elements in Table 6 are described as follows. media_type—defining a media type associated with synchronization information.

Table 7 defines values used for media_type.

TABLE 7

| media_type value | Meaning |
|---|---|
| 00 | Audio |
| 01 | Video |
| 10-11 | Reserved for future use | mpu_seq_num—the sequence number of an audio or video MPU, defined by media_type.

presentation_time—a time to play audio or video data, indicated by mpu_seq_num, on a screen via decoding.

Table 8 illustrates an example of media_sync_data when the RTP protocol is used.

TABLE 8

| Syntax | Number of bits | Format |
|---|---|---|
| media_sync_data(streaming_protocol) { | | |
| media_type | 2 | bslbf |
| packet_seq_num | 16 | uimbsf |
| timestamp | 32 | uimbsf |
| } | | |

Elements in Table 8 are described as follows.

media_type—defining a media type associated with synchronization information; may be defined as the same values as illustrated above in the MMT example in Table 7.

packet_seq_num—the sequence number of an RTP packet storing audio or video data, defined by media_type.

timestamp—a time to play audio or video data, indicated by packet_seq_num, on a screen via decoding.

Third Embodiment

In a third embodiment of the present invention, related audio and video data are designated based on audio and video play times in providing synchronization information in Table 9, and each MST transmits synchronization information on all packages included in a current ensemble.

TABLE 9

| Syntax | Number of bits | Format |
|---|---|---|
| media_sync_section( ) { | | |
| table_id | 8 | 0xXX |
| section_syntax_indicator | 1 | '0' |
| private_indicator | 1 | '1' |
| reserved | 2 | '11' |
| section_length | 12 | uimbsf |
| table_id_extension { | | |
| MST_protocol_version | 8 | uimbsf |
| ensemble_id | 8 | uimbsf |
| } | | |
| reserved | 2 | '11' |
| version_number | 5 | uimbsf |
| current_next_indicator | 1 | bslbf |
| section_number | 8 | 0x00 |
| last_section_number | 8 | 0x00 |
| multiplex_id | 16 | uimbsf |
| streaming_protocol | 3 | uimbsf |
| num_packages | 8 | uimbsf |
| for (i = 0; i<num_packages; ++i) { | | |
| package_id | 16 | uimbsf |
| default_video_stream_id | 16 | uimbsf |
| default_audio_stream_id | 16 | uimbsf |
| num_sync_data | 8 | uimbsf |
| for (j = 0; j <num_sync_data; ++j) { | | |
| media_sync_data(streaming_protocol); | | |
| } | | |
| } | | |

In Table 9, num_packages is the number of packages storing synchronization information, The third embodiment is similar to the first embodiment, but is different from the first embodiment in that synchronization information on all packages present in a current ensemble is included in an MST section. Thus, the MST section syntax and media_sync_data structure syntax used in the first embodiment may be reused.

Fourth Embodiment

In a fourth embodiment, play times are independently stored with respect to audio and video data in providing synchronization information in Table 10, and each MST transmits synchronization information on all packages included in a current ensemble.

TABLE 10

| Syntax | Number of bits | Format |
|---|---|---|
| media_sync_section( ) { | | |
| table_id | 8 | 0xXX |
| section_syntax_indicator | 1 | '0' |
| private_indicator | 1 | '1' |
| reserved | 2 | '11' |
| section_length | 12 | uimbsf |
| table_id_extension { | | |
| MST_protocol_version | 8 | uimbsf |
| ensemble_id | 8 | uimbsf |
| } | | |
| reserved | 2 | '11' |
| version_number | 5 | uimbsf |
| current_next_indicator | 1 | bslbf |
| section_number | 8 | 0x00 |
| last_section_number | 8 | 0x00 |
| multiplex_id | 16 | uimbsf |
| streaming_protocol | 3 | uimbsf |
| num_packages | 8 | uimbsf |
| for (i = 0; i<num_packages; ++i) { | | |
| package_id | 16 | uimbsf |
| default_video_stream_id | 16 | uimbsf |
| num_video_sync_data | 8 | uimbsf |
| for (i = 0; i<num_video_sync_data; ++i) { | | |
| media_sync_data(streaming_protocol); | | |
| default_audio_stream_id | 16 | uimbsf |
| num_audio_sync_data | 8 | uimbsf |
| for (i = 0; i<num_audio_sync_data; ++i) { | | |
| media_sync_data(streaming_protocol); | | |
| } | | |
| } | | |
| } | | |

In Table 10, num_packages is the number of packages storing synchronization information.

The fourth embodiment is similar to the second embodiment, but is different from the second embodiment in that synchronization information on all packages present in a current ensemble is included in an MST section. Thus, the MST section syntax and media_sync_data structure syntax used in the second embodiment are reused.

According to the embodiments of the present invention, audio and video data of a broadcast image are synchronized using synchronization information transmitted in a data link layer, thereby providing a shorter channel zapping time than that in a conventional synchronization operation performed by acquiring synchronization information through data filtering.

Although specific embodiments of the present invention have been described above, it will be apparent to those skilled in the art that the scope of the present invention is not limited to the above-described embodiments, and various modifications and modified forms may be made using the basic concept of the present invention without departing from the scope of the present invention.

The invention claimed is:

1. An electronic device for playing multimedia data, the electronic device comprising:
 a receiver configured to receive multimedia data related to a service selected by a user of the electronic device;
 a data processor configured to
  extract a first data stream received through a data link layer included in a protocol stack for data transmission, from among a plurality of data streams included in the multimedia data, wherein the first stream includes signaling information for audio streams or video streams included in the plurality of data streams;
 a synchronization information processor configured to extract, from the first data stream including the signaling information, synchronization information, including identifier information, relating to the service selected by the user;
 a service demultiplexer configured to
  identify a second data stream being an audio stream or a video stream related to the service selected by the user, from among the audio streams or video streams included in the plurality of data streams, based on the identifier information; and
 a broadcast image player configured to:
  decode the second data stream, and
  play the decoded second data stream based on the synchronization information,
 wherein the first data stream received through the data link layer is different from the second data stream received through both of the data link layer and other layers included in the protocol stack.

2. The electronic device of claim 1, wherein the synchronization information includes information on a time to play the second data stream being the audio stream or video stream.

3. The electronic device of claim 1, wherein the first synchronization information has a table format.

4. The electronic device of in claim 2, wherein the synchronization information further includes a sequence number of the audio stream or a sequence number of the video stream.

5. The electronic device of claim 2, wherein the synchronization information further includes data type information that defines the audio stream or the video stream, and a sequence number of the audio stream or the video stream defined by the data type information.

6. The electronic device of claim 2, wherein the first synchronization information includes information on one or more packages.

7. The electronic device of claim 2, wherein the synchronization information further includes identification information on a video stream and an audio stream to be played first and a number of pieces of the synchronization information.

8. A method for playing multimedia data by an electronic device, the method comprising:
 receiving multimedia data related to a service selected by a user of the electronic device;
 extracting signaling transmitted first data stream received through a data link layer included in a protocol stack for data transmission, from among a plurality of data streams included in the multimedia data, wherein the first stream includes signaling information for audio streams or video streams included in the plurality of data streams;
 extracting, from the first data stream including the signaling information, synchronization information, including identifier information, relating to the service selected by the user;
 identifying a second data stream being an audio stream or video stream related to the service selected by the user, from among audio streams or video streams included in the plurality of data streams, based on the identifier information;

decoding the second data stream; and playing the decoded second data stream based on the synchronization information, wherein the first data stream received through the data link layer is different from the second data stream received through both of the data link layer and other layers included in the protocol stack.

9. The method of claim 8, wherein the synchronization information includes information on a time to play the second data stream being the audio stream or the video stream.

10. The method of claim 8, wherein the synchronization information has a table format.

11. The method of claim 9, wherein the synchronization information further includes a sequence number of the audio stream or a sequence number of the video stream.

12. The method of claim 9, wherein the synchronization information further includes data type information that defines the audio stream or the video stream, and a sequence number of the audio stream or the video stream defined by the data type information.

13. The method of claim 9, wherein the synchronization information includes information on one or more packages.

14. The method of claim 9, wherein the synchronization information further includes identification information on a video stream and an audio stream to be played first and a number of pieces of the synchronization information.

15. The electronic device of claim 1, wherein the synchronization information processor is further configured to:

extract, from the synchronization information, first synchronization information relating to the second data stream, and the broadcast image player is further configured to play the decoded second data stream based on the first synchronization information.

16. The method of claim 9, further comprising:

extracting first synchronization information relating to the second data stream; and playing the decoded second data stream on the first synchronization information.

17. The electronic device of claim 1, wherein the other layers include an application/presentation session layer, a network/transport layer, or a physical layer.

18. The method of claim 8, wherein the other layers include an application/presentation session layer, a network/transport layer, or a physical layer.

* * * * *